Patented Dec. 27, 1938

2,141,316

UNITED STATES PATENT OFFICE 2,141,316

ARC WELDING FLUX

Arnold Mitchell Roberts, Flixton, England, assignor to General Electric Company, a corporation of New York No Drawing. Application December 14, 1936, Serial No. 115,882. In Great Britain January 8, 1936

2 Claims. (Cl. 219—8)

My invention relates to arc welding fluxes and more particularly to metallic electrodes provided with flux coatings.

In metallic arc welding the weld is produced through the agency of an arc established between the work and a metal rod or pencil commonly referred to as an electrode. By associating certain materials with the electrode, the operating characteristics of the welding arc and the quality of the weld metal deposited are greatly improved. Such materials are referred to as fluxes.

It is an object of my invention to provide an arc welding flux of improved composition.

It is a further object of my invention to provide a flux coated electrode of the heavy slagging type which is particularly suited for welding structures and pressure vessels where great strength and ductility are essential.

Further objects of my invention will become apparent from a consideration of the following description thereof.

The improved flux of my invention comprises a mixture of siliceous clay and manganese dioxide. When it is applied as a coating to the surface of an electrode it will also contain a binder such as sodium silicate, gum arabic, ethyl orthosilicate and the like.

The flux as applied to an electrode may have the following composition, the proportions being given by weight:

| | Per cent |
|---|---|
| Siliceous clay | 25 to 60 |
| Manganese dioxide | 75 to 40 | with enough sodium silicate or other binder to provide a paste of suitable consistency.

Where the improved flux is employed for coating welding electrodes, the welding wire or rod is preferably provided with a cellulosic covering braided or spun onto the electrode or rod and the flux is applied to this covering by extrusion.

The welding wire or rod to which this flux is applied may be a low carbon steel having substantially the following composition by weight:

| | Per cent |
|---|---|
| Carbon | 0.06 to 0.13 |
| Manganese | 0.3 to 0.6 |
| Silicon, not greater than | 0.04 |
| Sulphur, not greater than | 0.04 |
| Phosphorus, not greater than | 0.4 |
| Iron | Remainder |

Best results are obtained with my improved flux coated electrode when using a direct current source of welding current, the positive terminal of which is connected to the electrode. A fairly short arc should be held.

The surfaces to be welded should be free from scale, paint or dirt. When the best results are required the work should be arranged, if possible, in a flat position as the molten metal deposited is quite fluid. In cases where the weld cannot be made in one pass, parallel overlapping beads should be used in order to reduce to a minimum any oscillation at the tip of the electrode. This is desirable because a considerable amount of slag is produced during welding. This slag is very light and floats on the surface of the molten metal, allowing the welder to see the metal at all times. All slag must be removed from one bead before laying down the next bead. This may be accomplished after the slag has cooled by tapping it lightly or by brushing it with a wire brush.

The metal deposited has a very dense and refined structure, giving a tensile strength of 29 to 30 tons per sq. in. and an elongation of 30% on a length of $$4\sqrt{area}$$

with a reduction in area of 50% on tensile specimens machined from the deposited metal. The weld metal at time of deposit is very fluid and its slow rate of contraction ensures the minimum of locked-up stresses in the weld.

The above described electrode is particularly useful for welding pressure vessels, boilers, pipe lines and all parts of structures of primary importance where the weld has to withstand severe loading. It is an ideal electrode for filling blow holes in steel castings and for welding high tensile steels. It is also particularly suited for welding ship structures, for building up shafts, for work which has to withstand hot forging, and for general high-class repairs.

My improved flux composition is not limited in its use as a coating on electrodes, since beneficial results may also be obtained by applying it as a covering on the work where the welding operation is to be performed. Certain fillers and diluents may be added to my flux without departing from my invention.

What I claim as new and desire to secure by Letters Patent of the United States is:

1. A flux for use in arc welding having substantially the following composition by weight:

| | Per cent |
|---|---|
| Siliceous clay | 25 to 60 |
| Manganese dioxide | 75 to 40 |

2. An electrode having a coating of substantially the following composition by weight:

| | Per cent |
|---|---|
| Siliceous clay | 25 to 60 |
| Manganese dioxide | 75 to 40 | and a binder.

ARNOLD MITCHELL ROBERTS.